United States Patent [19]

Kambe et al.

[11] Patent Number: 4,689,263
[45] Date of Patent: Aug. 25, 1987

[54] MAGNETIC RECORDING MEDIUM

[75] Inventors: Hirokazu Kambe, Saku; Kazuhiro Kuroda, Karuizawa; Masashi Hayama, Usuda, all of Japan

[73] Assignee: TDK Corporation, Tokyo, Japan

[21] Appl. No.: 644,254

[22] Filed: Aug. 27, 1984

[30] Foreign Application Priority Data

Sep. 2, 1983 [JP] Japan ............................ 58-160267

[51] Int. Cl.$^4$ ............................................ G11B 5/706
[52] U.S. Cl. .................................... 428/212; 427/128; 427/131; 428/216; 428/328; 428/329; 428/694; 428/215; 428/900
[58] Field of Search ............... 428/694, 328, 329, 900, 428/212, 215, 216; 427/131, 128; 252/62.54

[56] References Cited

U.S. PATENT DOCUMENTS

| | | | |
|---|---|---|---|
| 4,410,590 | 10/1983 | Kawahara | 428/336 |
| 4,439,796 | 3/1984 | Kitamoto | 427/131 |
| 4,506,000 | 3/1985 | Kubota | 428/694 |
| 4,624,883 | 11/1986 | Yamaguchi | 428/694 |
| 4,624,894 | 11/1986 | Kishimoto | 428/694 |

FOREIGN PATENT DOCUMENTS

| | | | |
|---|---|---|---|
| 159237 | 9/1983 | Japan | 428/329 |
| 144040 | 8/1984 | Japan | 428/329 |
| WO83/01145 | 3/1983 | World Int. Prop. O. | 428/329 |
| WO83/01144 | 3/1983 | World Int. Prop. O. | 428/329 |

Primary Examiner—Ellis P. Robinson
Attorney, Agent, or Firm—Oblon, Fisher, Spivak, McClelland & Maier

[57] ABSTRACT

A magnetic recording medium comprising a substrate and magnetic recording double-layers formed on the substrate, wherein the magnetic material of the magnetic recording under-layer is composed essentially of an alloy or metal magnetic powder having a specific surface area of at most 30 m$^2$/g as measured by BET method, and the magnetic material of the magnetic recording top-layer is composed essentially of an iron oxide or Co-adsorbed iron oxide powder having a specific surface area of at least 25 m$^2$/g as measured by BET method.

2 Claims, 3 Drawing Figures

MAGNETIC RECORDING MEDIUM

BACKGROUND OF THE INVENTION

1. Field of the Invention

The present invention relates to a magnetic recording medium, and more particularly to a magnetic recording medium having a double layered structure.

2. Description of the Prior Art

In recent years, there have been commercial developments of tapes wherein an alloy powder or metal powder is used as magnetic powder for high performance audio recording tapes. However, such a fine metal powder is very active in contrast with an iron oxide powder. In an extreme case, when exposed in air, such a metal powder undergoes spontaneous ignition. Accordingly, it is an important subject to provide a some safety measure. In general, the finner the metal powder, the more active it becomes. It is well known that if the metal powder is made coarse, it will be stabilized. However, the noise (AC bias noise) characteristics will be deteriorated by an increase of the particle size. Under the circumstances, it is obliged to use fine particles with a specific surface area of at least 30 $m^2/g$ as measured by BET method. It would be possible to reduce the danger during the process for the production of the tape and also to minimize a change with time of the tape itself if the particle size could be enlarged to some extent so that a stabilized metal powder would be employed. In this respect, the present inventors have made a study to find out whether or not it is possible to use a magnetic metal having a more or less large particle size and yet to adequately reduce the noise.

On the other hand, an iron oxide-type magnetic powder in the form of fine particles is widely used for magnetic tapes. The iron oxide-type magnetic powder is chemically stable and gives a low noise level. However, the transfer characteristics and the low frequency sensitivity tend to deteriorate as the fine particles become finner. Accordingly, it has been difficult to employ a super fine particulate powder.

SUMMARY OF THE INVENTION

It is an object of the present invention to provide a magnetic recording medium having a low noise level and a high sensitivity in low frequency region.

As a result of an extensive research, the present inventors have found it possible to provide a magnetic recording medium having a highly sensitive electric characteristics without impairing the noise characteristic even when a alloy or metal powder having a relatively large particle size is employed.

Namely, the present invention provides a magnetic recording medium comprising a substrate and magnetic recording double-layers formed on the substrate, wherein the magnetic material of the magnetic recording under-layer is composed essentially of an alloy or metal magnetic powder having a specific surface area of at most 30 $m^2/g$ as measured by BET method, and the magnetic material of the magnetic recording top-layer is composed essentially of an iron oxide or Co-adsorbed iron oxide powder having a specific surface area of at least 25 $m^2/g$ as measured by BET method.

The fine iron-oxide type powder used for the top-layer is per se usually poor in the transfer characteristic and the low frequency sensitivity. Likewise, the alloy or metal powder used for the under-layer and having a relatively large particle size is per se likely to have an inferior noise characteristic. In the magnetic recording medium of the present invention having the above double layered structure, the properties of the top and under layers provide a synergistic effect whereby not only the drawbacks of the fine iron-oxide type powder are totally eliminated in spite of the top-layer made of such fine iron-oxide type powder, but also the noise characteristic is remarkably improved in spite of the under layer made of an alloy or metal powder having a relatively large particle size. Further, it has been found that there is no substantial property change with time, and the stability of the alloy or metal powder during the preparation of the magnetic recording medium can be secured. Thus, according to the present invention, drawbacks which used to be difficult to avoid when the top- or under-layer was used alone, do not appear, and the merits of the top- and under-layers cooperate to provide the synergistic effect.

Now, the present invention will be described in detail with reference to the preferred embodiments.

DETAILED DESCRIPTION OF THE PREFERRED EMBODIMENT

Figure 1:
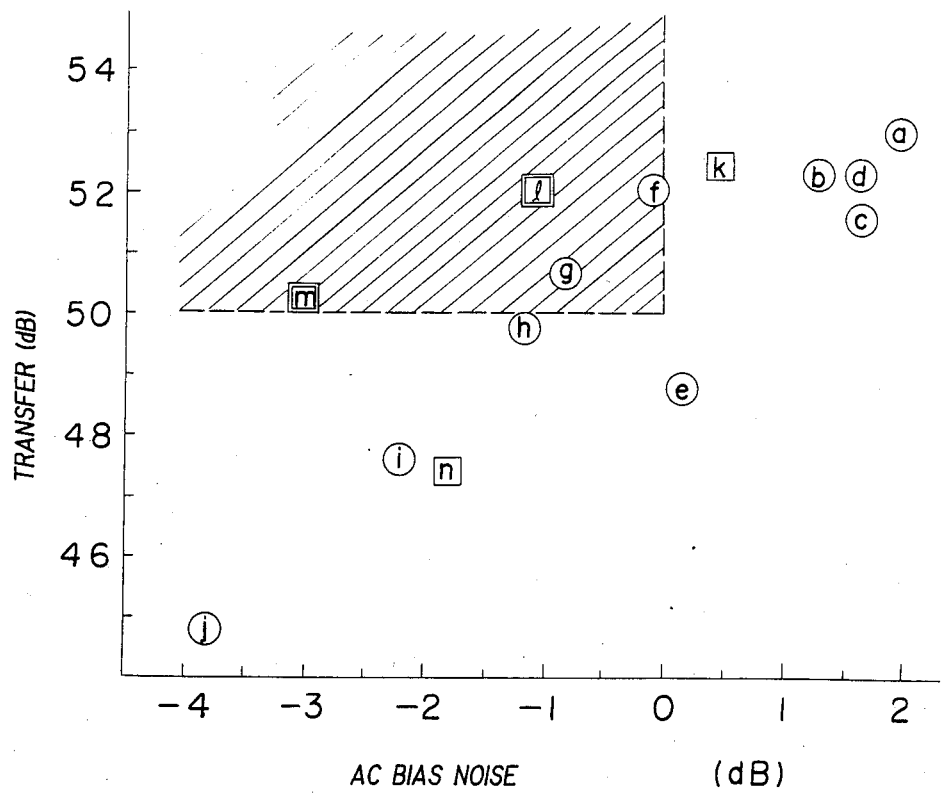
FIG. 1 is a graph illustrating the relationships between the AC bias noise and the transfer with respect to various single-layered and double-layered tapes listed in Table 1.

It has been found that in order to adequately attain the object of the present invention, it is desirable that the thickness of the top-layer is at most equal to the thickness of the under-layer. If the ratio in the thickness of the two layers (top-layer thickness/under-layer thickness) exceeds 1.0, problems such as an decrease in the sensitivity or an increase of the transfer are likely to result. On the other hand, if the ratio is less than 0.20, there will be a problem such as an increase of a noise. Therefore, in order to obtain a tape wherein an adequate low frequency sensitivity, noise and transfer are well balanced, it is preferred that the ratio of the top-layer thickness to the under-layer thickness is within the range of from 0.20 to 1.0. This tape (having a double layered structure) preferably has Br of at least 2000 gauss.

Now, the present invention will be described with reference to Examples. However, it should be understood that the present invention is by no means restricted to these specific Examples.

EXAMPLES (1) Preparation of coating materials for the under-layer and preparation tapes

|  | Parts by weight |
| --- | --- |
| Metal magnetic powder (with various surface areas) | 100 |
| Vinyl chloride-vinyl alcohol copolymer | 15 |

-continued

| | Parts by weight |
|---|---|
| (VAGH manufactured by U.C.C.) | |
| Polyurethane resin | 10 |
| (N-2304 manufactured by Nippon Polyurethane Co.) | |
| Oleic acid | 2 |
| Alumina powder | 2 |
| (average particle size: 0.5 μm) | |
| MEK | 85 |
| Toluene | 85 |
| Cyclohexanone | 85 |

The above composition for the coating material was mixed and dispersed in a ball mill for about 48 hours to obtain a magnetic coating material. To this coating material, 5 parts by weight of a polyisocyanate (COLONATE L manufactured by Nippon Polyurethane Co.) was added as a curing agent, and thoroughly mixed and stirred. Then, the mixture was coated on a polyurethane terephthalate film having a thickness of 8 μm while applying orientation treatment, and then dried. Then, the coated film was subjected to surface treatment by super calendering, and further subjected to heat curing treatment.

The average particle size of the metal magnetic powder in the above coating composition was varied, i.e., magnetic powders having specific surface areas of 20.5, 23.3, 24.1, 27.6 and 35.8 m²/g, respectively, as measured by BET method, were used. The respective coating materials were designated as coating material $M_1$ to $M_5$, and the respective tapes (each having a single layered structure) were designated as tapes a to e. (See Table 1.)

(2) Preparation of coating materials for the top-layer and preparation of tapes

The above composition was mixed and dispersed in a ball mill for about 48 hours to obtain a magnetic coating material. This coating material was coated on a polyethylene terephthalate film having a thickness of 8 μm while applying orientation treatment. After drying, the coated film was subjected to surface treatment by super calendering.

The specific surface area of the Co-adsorbed iron oxide powder in the above coating composition was varied, i.e. magnetic powders having specific surface areas of 22.9, 26.1, 27.3, 32.0 and 39.1 m²/g, respectively, were used as the Co-adsorbed iron oxide powder. The respective coating materials were designated as coating materials $F_1$ to $F_4$, and the respective tapes (each having a single layered structure) were designated as tapes f to j. (See Table 1.)

(3) Preparation of double-layered tapes

Coating materials $M_2$ and $M_5$ prepared in the above-mentioned manner were, respectively, coated on polyethylene terephthalante films having a thickness of 8 μm so that the thickness after the calender treatment would be about 3 μm, and then subjected to calender treatment and heat curing. Thereafter, coating materials $F_1$, $F_3$, $F_4$ and $F_5$ are, respectively, coated thereon so that the thickness after the calender treatment would be about 2 μm, and then subjected to calender treatment to obtain sample tapes k to n. (See Table 1.)

These tapes were cut into audio tapes with a width of 3.81 mm. Then, various characteristics were measured. The results are shown in Table 1. Among them, tapes l and m represent the tapes of the present invention.

In the Table, Hc is coercive force, Br is a residual magnetic flux density, S-315 is a reproduction output at 315 Hz, S-16-K is a reproduction output at 16 KHz (relatively to a standard tape) and P.T is a transfer characteristic.

TABLE 1

| | | | Magnetic powders | Characteristics of tapes | | | | | |
|---|---|---|---|---|---|---|---|---|---|
| Layer structure of tapes | Tapes | Coating materials | Specific surface area (m²/g) | Thickness of layers (μ) | Hc (Oe) | Br (G) | S-315 (dB) | S-16-K (dB) | Bias noise (dB) | P.T. (dB) |
| Single under-layer | a | $M_1$ | 20.5 | 4.2 | 667 | 3300 | 2.9 | 1.6 | 2.0 | 53.4 |
| | b | $M_2$ | 23.3 | 4.8 | 697 | 3490 | 3.1 | 3.2 | 1.3 | 52.3 |
| | c | $M_3$ | 24.1 | 4.1 | 773 | 3040 | 2.1 | 4.2 | 1.7 | 51.8 |
| | d | $M_4$ | 27.6 | 3.7 | 786 | 3120 | 2.1 | 5.3 | 1.7 | 52.3 |
| | e | $M_5$ | 35.8 | 4.2 | 827 | 2750 | 1.3 | 5.2 | 0.2 | 48.8 |
| Single top-layer | f | $F_1$ | 22.9 | 4.9 | 721 | 1790 | 0.4 | 3.3 | −0.1 | 52.1 |
| | g | $F_2$ | 26.1 | 5.0 | 692 | 1760 | 0.1 | 1.6 | −0.8 | 50.7 |
| | h | $F_3$ | 27.3 | 4.7 | 707 | 1620 | −0.4 | 2.5 | −1.2 | 49.3 |
| | i | $F_4$ | 32.0 | 3.9 | 696 | 1700 | −0.7 | 2.0 | −2.2 | 47.6 |
| | j | $F_5$ | 39.1 | 3.8 | 682 | 1400 | −1.1 | 1.9 | −3.8 | 44.9 |
| Double-layers | k | $F_1/M_2$ | — | Top/Under 2.1/2.9 | 707 | 2810 | 1.9 | 3.5 | 0.5 | 52.5 |
| | l | $F_3/M_2$ | — | 2.1/3.0 | 703 | 2710 | 1.7 | 2.8 | −1.1 | 52.1 |
| | m | $F_5/M_2$ | — | 2.0/3.2 | 698 | 2650 | 1.5 | 2.0 | −3.0 | 50.2 |
| | n | $F_4/M_5$ | — | 2.2/3.0 | 774 | 2350 | 0.6 | 2.3 | −1.8 | 47.4 |

| | Parts by weight |
|---|---|
| Co—adsorbed iron oxide powder (with various surface areas) | 100 |
| Vinyl chloride-vinyl acetate-vinyl alcohol copolymer (VAGH) | 18 |
| Polyurethane resin (N-2304) | 7 |
| Lecithin | 2 |
| α-SiC (average particle size 0.2 μm) | 1 |
| Vinyl chloride stabilizer | 0.5 |
| Myristic acid | 1 |
| MEK | 85 |
| MIBK | 85 |
| Toluene | 85 |

Figure 2:
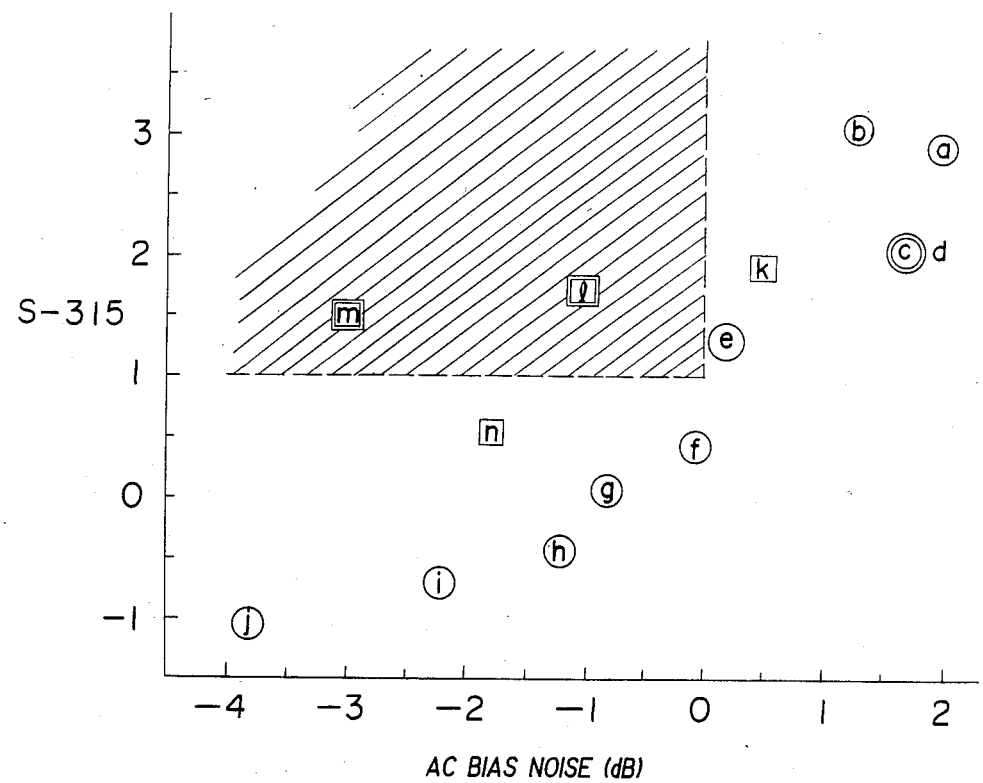
FIG. 2 is a graph illustrating the relationships between the AC bias noise and S-315 (the sensitivity at 315 Hz) with respect to the same tapes.

Based on the results of Table 1, the relationships between the transfer characteristic, the low frequency sensitivity (a relative value of the reproduction output at 315 Hz) and the AC bias noise are shown in FIGS. 1 and 2. It is evident from FIG. 1 that the tapes having adequately low AC bias noise and adequately low transfer, are tapes l, m, f and g falling in the hatched portion. However, as is apparent from FIG. 2, tapes f and g have poor low frequency sensitivity, whereas tapes l and m have high sensitivity. As a whole, the magnetic tapes l and m exhibit outstanding characteristics where the noise, transfer and low frequency sensitivity are well balanced.

Figure 3:
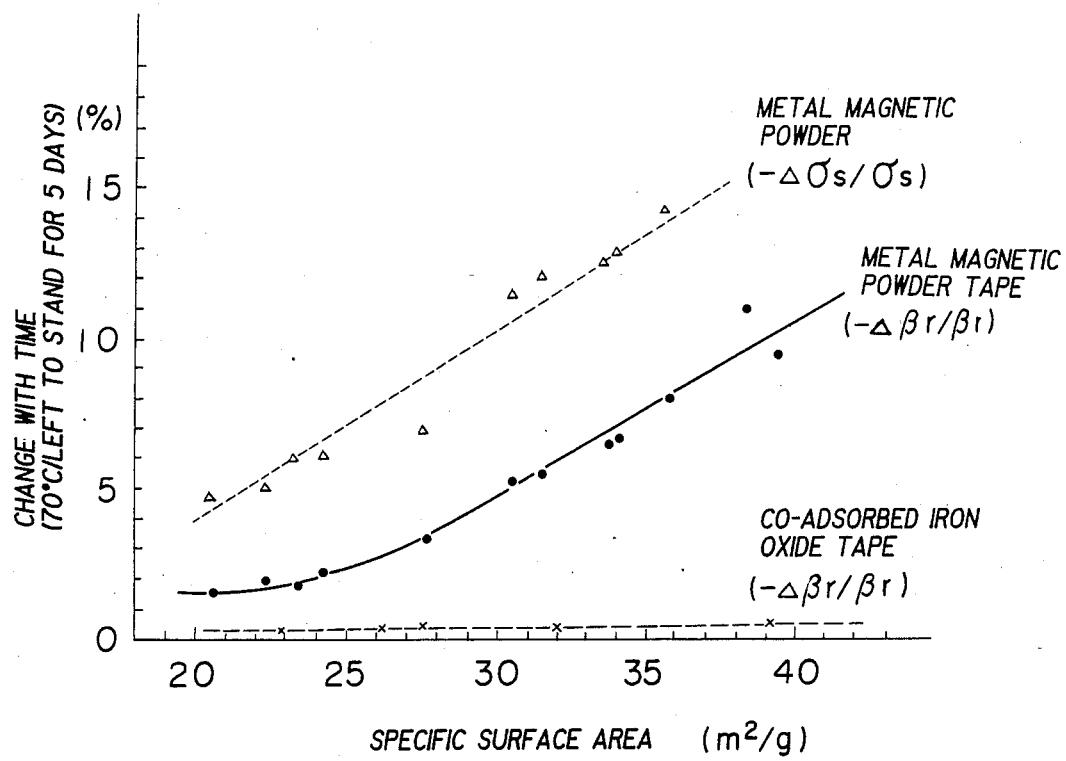
FIG. 3 is a graph illustrating the relationships between the changes with time of a metal magnetic powder, a tape wherein the metal magnetic powder is used and a tape wherein a Co-adsorbed iron oxide was used, and the specific surface areas of the respective magnetic powders.

The tapes showing high sensitivity in FIG. 2 all have Br of at least 2000 G. The higher the value of Br, the higher the low frequency sensitivity. Accordingly, a single-layered tape using an alloy powder has higher sensitivity than the double-layered tapes. However, the alloy magnetic powder and the magnetic tape made thereof tend to be unstable and will have greater change with time as the specific surface area increases in contrast with the oxide magnetic powder, as shown in FIG. 3. Furthermore, in some cases, there is a danger of catching fire during the production. Therefore, it is desired to decrease the activity by selecting the specific surface area of at most 30 m$^2$/g. However, if such a low specific surface area is selected (see tapes a, b, c and d), the noise tends to increase. Whereas, as is evident from the tapes l and m, the noise can be substantially reduced without a substantial reduction of the low frequency sensitivity by using alloy powder having a low specific surface area of at most 30 m$^2$/g for the under-layer and an oxide magnetic powder having a specific surface area of at least 25 m$^2$/g for the top-layer. The oxide magnetic powder used for the top-layer has a poor low frequency sensitivity. Nevertheless, when used as the top-layer in combination with the under-layer to form the double-layered structure and the ratio of the top-layer thickness to the under-layer thickness is set to be not higher than 1.0, the desired characteristics of the under-layer can fully be produced without a substantial reduction of the low frequency sensitivity. Besides, since the specific surface area of the magnetic powder of the top layer is sufficiently large, the noise level can be adequately lowered, and no substantial adverse effect will be brought about from the under-layer. Furthermore, with respect to the transfer characteristic, the desirable influence of the small specific surface area of the under-layer overcomes the inferior transfer characteristic of the top-layer and substantially eliminates the adverse effect of the latter.

On the other hand, while the top-layer is influential to the noise and the high frequency sensitivity (the short wave recording sensitivity), it does not require so high Br for a short wave recording, and accordingly it is possible to obtain an adequate high frequency sensitivity by using an oxide magnetic powder for the top-layer.

What is claimed is:

1. A magnetic recording medium comprising a substrate and magnetic recording double-layers formed on the substrate, wherein the magnetic material of the magnetic recording under-layer is composed essentially of an alloy or metal magnetic powder having a specific surface area of at most 30 m$^2$/g as measured by, BET method, and the magnetic material of the magnetic recording top-layer is composed essentially of an iron oxide or Co-coated iron oxide powder having a specific surface area of at least 25 m$^2$/g as measured by BET method.

2. The magnetic recording medium according to claim 1, wherein the ratio of the thickness of the magnetic recording top-layer to the thickness of the magnetic recording under-layer is at most 1.0 and the residual magnetic flux density Br of the magnetic recording double-layers is at least 2000 gauss.

* * * * *